(No Model.) 3 Sheets—Sheet 1.

A. DAVID.
GRAPE AND APPLE CRUSHER.

No. 358,597. Patented Mar. 1, 1887.

Witnesses,
Geo. H. Strong
J. H. Morse

Inventor,
August David
By Dewey & Co.
Attys (No Model.) 3 Sheets—Sheet 2.
A. DAVID.
GRAPE AND APPLE CRUSHER.
No. 358,597. Patented Mar. 1, 1887.
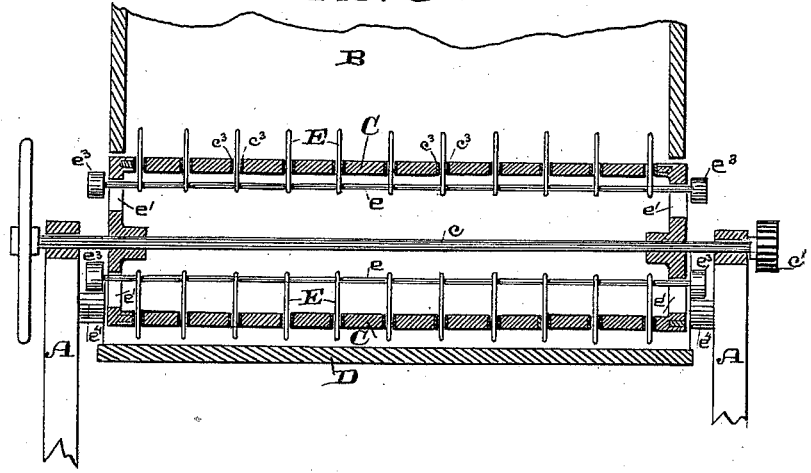
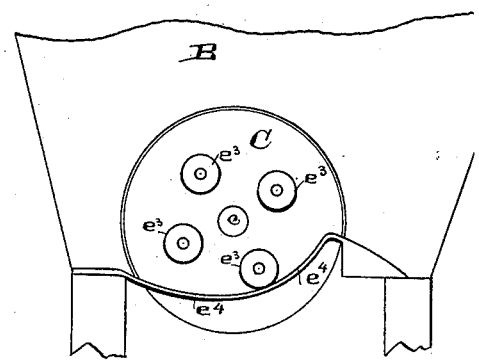
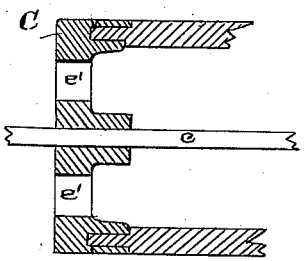
Witnesses,
Geo. H. Strong.
J. H. Nurse
Inventor,
August David
By Dewey & Co.
attys (No Model.)  3 Sheets—Sheet 3.

A. DAVID.
GRAPE AND APPLE CRUSHER.

No. 358,597.  Patented Mar. 1, 1887.

Witnesses,
Geo. H. Strong.
S. H. Nourse

Inventor,
August David
By Dewey & Co.
Attys

UNITED STATES PATENT OFFICE.

AUGUST DAVID, OF SAN FRANCISCO, CALIFORNIA.

GRAPE AND APPLE CRUSHER.

SPECIFICATION forming part of Letters Patent No. 358,597, dated March 1, 1887.

Application filed September 29, 1886. Serial No. 214,891. (No model.)

*To all whom it may concern:*

Be it known that I, AUGUST DAVID, of the city and county of San Francisco and State of California, have invented an Improvement in Grape and Apple Crushers; and I hereby declare the following to be a full, clear, and exact description thereof.

My invention relates to the class of fruit-crushing machines; and my invention consists in the peculiarly-constructed rotating cylinder operating in conjunction with the spring-mounted resisting-platform and having adjustable pins, teeth, or knives for directing the material to be crushed, all of which, together with details of construction, I will hereinafter fully describe.

The object of my invention is to provide a simple and effective grape and apple crusher.

Figure 1:
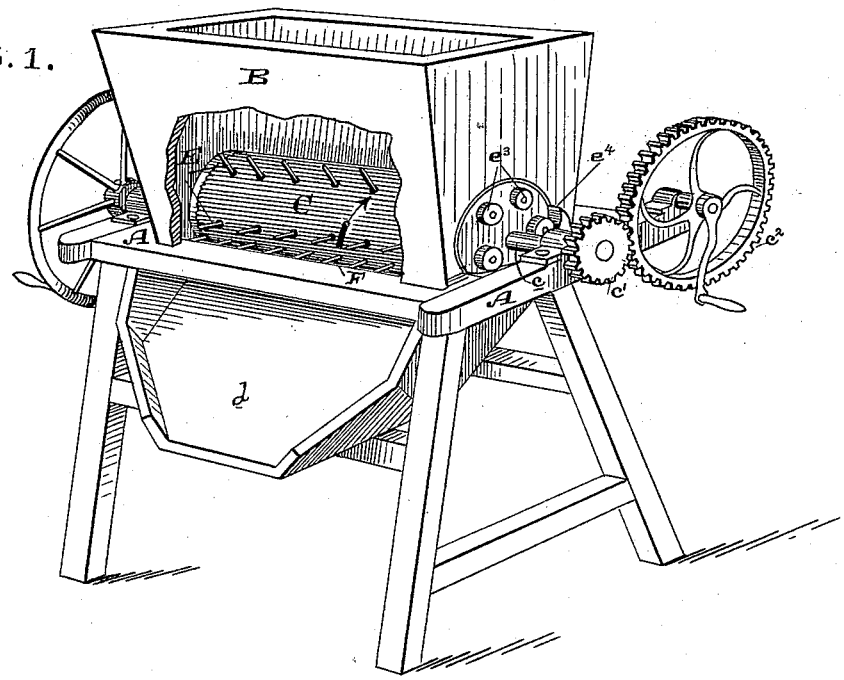
Figure 2:
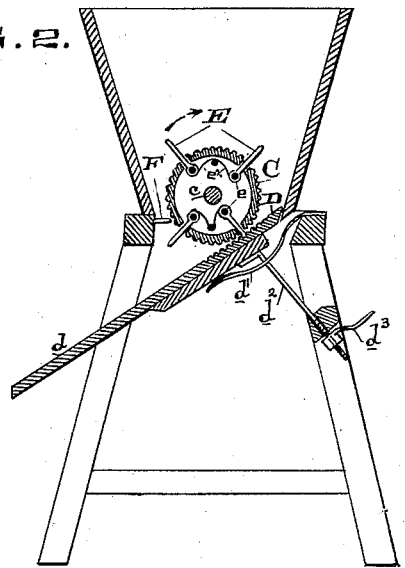
Figure 7:
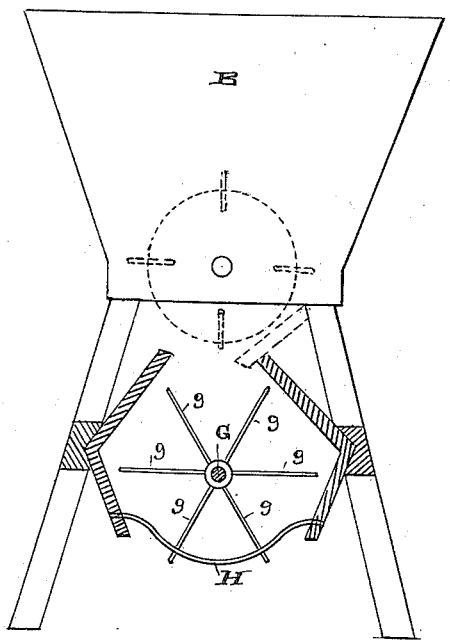
Figure 8:
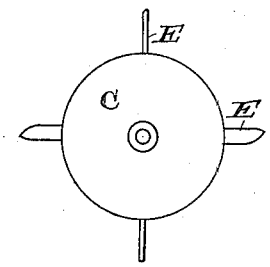

Referring to the accompanying drawings, Figure 1 is a perspective view of my crusher, the front of the hopper being broken away. Fig. 2 is a vertical cross-section of same. Fig. 3 is a vertical longitudinal section. Fig. 4 is a cross-section of cylinder C. Fig. 5 is an end elevation showing the cam-tracks. Fig. 6 is a detail section of one end of the cylinder. Fig. 7 is a view showing the addition of the stemmer. Fig. 8 is a view showing the knives and pins alternating.

A is a frame, table, or stand, upon which is mounted the hopper B. Within the neck of the hopper is the crushing-cylinder C, the shaft $c$ of which is mounted in bearings upon the frame or table, and said cylinder is rotated by suitable gearing, such as is here represented by a pinion, $c'$, on the cylinder-shaft and the crank-gear $c^2$. Under the neck of the hopper and just below the cylinder is the resisting-platform D, the continuation $d$ of which forms a discharge-chute. This platform is supported by springs $d'$, and its distance from the periphery of the cylinder is regulated by means of a screw-bolt or standard, $d^2$, secured under it and passing down through a guide in the frame and fitted with a crank-nut, $d^3$, on its lower end. The cylinder itself is composed of a number of segmental pieces or staves, as shown in the cross-section. These are bound together by means of hoops or bands at each end, which hold them firmly to their seats on the ends or heads of said cylinder.

E are pins, which pass radially through apertures or holes in the cylinder, their inner ends being secured to the shafts $e$, passing longitudinally through the cylinder and through elongated radial slots $e'$ made in the ends or heads of the cylinder, Fig. 3. These shafts are held outwardly toward the circumference of the cylinder, for the purpose of projecting the pins, by means of springs $e^2$, Fig. 4, and the ends of the shafts are provided with rollers or wheels $e^3$, which, in the revolution of the cylinder, are adapted to come in contact with eccentric tracks or cams $e^4$ on each end of the frame or stand, whereby the shafts are forced toward the center of the cylinder, thereby withdrawing their pins in the vicinity of the platform, Fig. 5.

Extending inwardly toward the cylinder from the frame or from the neck of the hopper are a number of guard-pins or teeth, forming a retaining-rack, F, which prevents the grapes or other fruit from passing down between the front of the cylinder and the neck of the hopper.

In crushing grapes the kind of teeth required are simply pins, such as are shown in Fig. 1; but in crushing apples, though the pins alone may be used, I may also use teeth made as knives, as are shown in Fig. 8, said knives being used in connection with the pins—as, for example, alternate rows of knives and pins—the knives being mounted and adjusted in the same manner as the pins. They are adapted for the cutting up of the apples before they pass between the crushing-surfaces. The apertures in the cylinder through which the pins, teeth, or knives pass are lined with metal ferrules $c^3$, so that the swelling of the wood of the cylinder will not interfere with the free movement of the pins, Fig. 4.

The cylinder can be made of metal staves, and its surface, as well as that of the platform, may be either plain or corrugated.

The operation of my machine is as follows: The grapes or apples are fed into the hopper and the cylinder is rotated in the direction shown by the arrow. The fruit is engaged by the pins or by the pins and knives, as the case may be, and carried or directed over to the back of the cylinder, so that it passes down between said cylinder and the opposing or resisting platform, whereby it is crushed. The pins or knives, as they approach the resisting-platform, are withdrawn by the rollers $e^3$, traveling on the eccentric or cam tracks $e^4$, so that they project but slightly while passing the platform, but sufficient to drag the fruit through; but after passing the platform they are still further withdrawn, so as not to carry up any of the fruit mass or stems with them, and when above the level of the stems or fruit mass they begin again to project until, when the cams are passed, they project completely.

The machine may be used simply as a crusher; but in some cases I may construct below it, as I have shown in Fig. 7, the stemmer, which has heretofore been secured to me by Letters Patent No. 320,049, dated June 16, 1885. I need not particularly describe this stemmer, further than to indicate the rotating shaft G, provided with its series of arms or teeth $g$, working through a grated frame, H, below. In this case the discharge-chute $d$ would direct the material crushed—juice, stems, and all—into the stemmer. By supporting the platform on springs there is no danger of clogging or breaking, as it yields to undue pressure.

Having thus described my invention, what I claim as new, and desire to secure by Letters Patent, is—

1. In a grape and apple crusher, a hopper and a platform located below its neck, in combination with a rotating cylinder in the neck of the hopper, between which and the platform the material is crushed, and radially-adjustable pins, teeth, or knives in said cylinder, mounted upon spring-actuated shafts, withdrawing partially in the vicinity of the platform and again projecting, substantially as described.

2. In a grape and apple crusher, the rotating cylinder having the radially-mounted and spring-actuated automatically-adjustable pins, teeth, or knives, in combination with the opposing or resisting platform mounted upon a spring or elastic support, substantially as described.

3. In a grape and apple crusher, the combination of the crushing-cylinder having the radially-mounted pins, teeth, or knives, the adjustable shafts upon which they are mounted, the springs holding said shafts outwardly for projecting the pins, and a cam on the frame, with which the shafts engage, for forcing them inwardly and withdrawing the pins, substantially as described.

4. In a grape and apple crusher, the combination of the rotating cylinder having apertures protected by ferrules, as described, and provided with the pins, teeth, or knives passing loosely through said ferrules, the shafts on which they are mounted, the springs holding said shafts out, and a cam for forcing the shafts inwardly and withdrawing the pins, teeth, or knives, substantially as described.

5. In a grape and apple crusher, the main frame, stand, or table A and the hopper B, carried thereby, in combination with the rotating crushing-cylinder C within the neck of the hopper and having the radially-adjustable pins, teeth, or knives E, the adjustable shafts $e$, on which they are mounted, the springs $e^2$, for holding said shafts outwardly to keep the pins projected, and the cams $e^4$ on the main frame, and rollers $e^3$ on the shafts, for forcing said shafts toward the center and withdrawing the pins, substantially as described.

6. In a grape and apple crusher, a frame, table, or stand, A, the hopper B thereon, and the spring-supported platform D under the neck of the hopper, in combination with the rotating cylinder C in the neck of the hopper, the pins, teeth, or knives mounted radially in the said cylinder, the adjustable shafts $e$, upon which they are mounted, the springs $e^2$, for holding the shafts out and the pins, teeth, or knives projected, and the cams $e^4$ and rollers $e^3$, for forcing the shafts in and partially withdrawing the pins, teeth, or knives in the vicinity of the platform, substantially as described.

7. In a grape and apple crusher, the frame, stand, or table A and the hopper B thereon, in combination with the rotating cylinder C in the neck of the hopper having the radially-adjustable pins, teeth, or knives E projected and withdrawn, as described, the spring-actuated shafts upon which the pins are mounted, and the spring-mounted platform D under the neck of the hopper, having the adjusting-bolt $d^2$ and nut $d^3$, whereby its distance from the cylinder may be regulated, substantially as described.

8. A grape and apple crusher comprising the stand A, the hopper B, the rotating cylinder C in the neck of the hopper, the radially-adjustable pins, teeth, or knives E in said cylinder and mounted upon spring-actuated shafts, the fixed rack F in the neck of the hopper, and the adjustable spring-mounted resisting-platform D under the cylinder, all arranged and adapted to operate substantially as described.

In witness whereof I have hereunto set my hand.

AUGUST DAVID.

Witnesses:
S. H. NOURSE,
H. C. LEE.